UNITED STATES PATENT OFFICE.

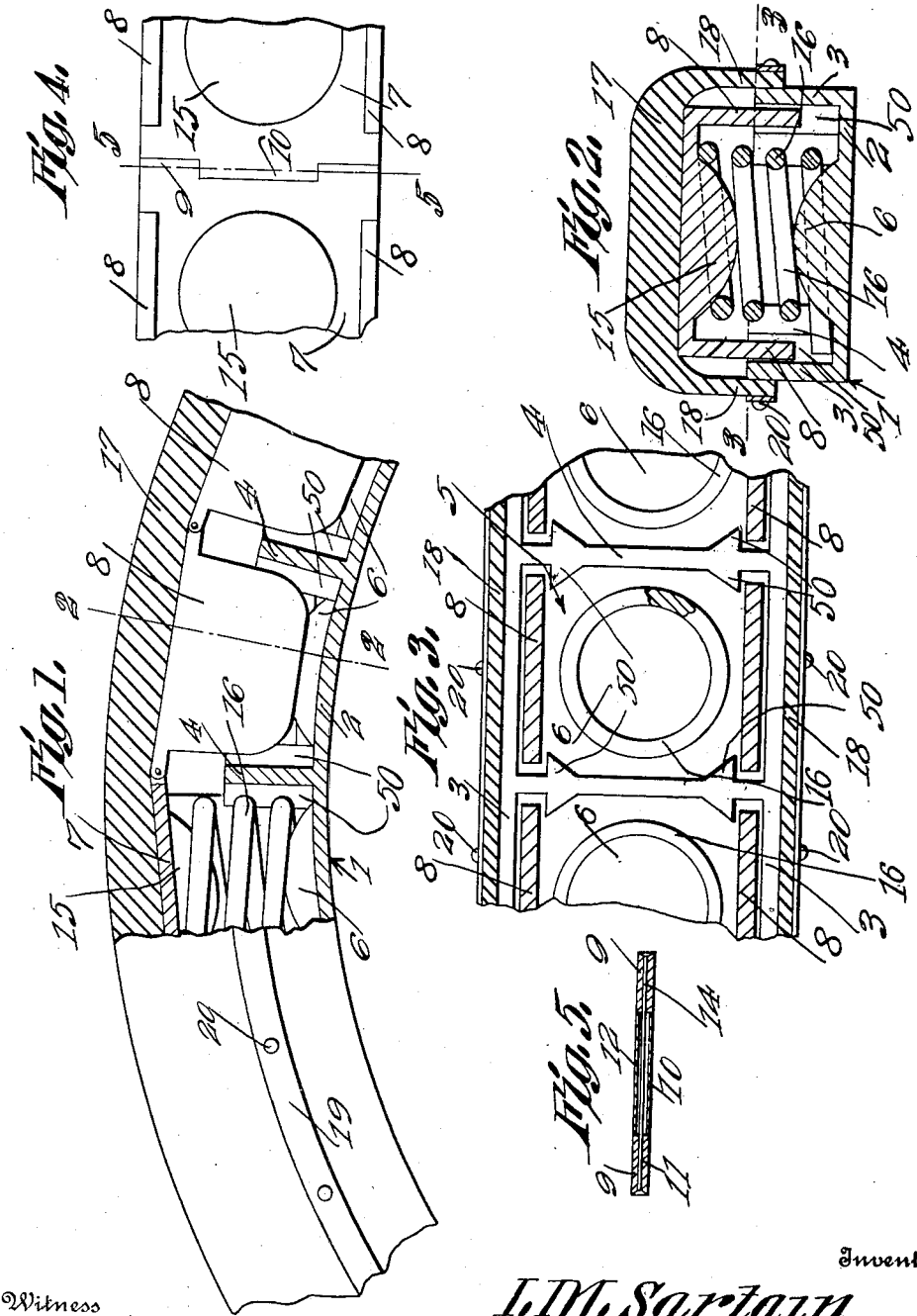

ISAAC MORGAN SARTAIN, OF TRACY CITY, TENNESSEE.

SPRING-TIRE.

1,329,021.　　　　　Specification of Letters Patent.　　Patented Jan. 27, 1920.

Application filed May 19, 1917. Serial No. 169,748.

*To all whom it may concern:*

Be it known that I, ISAAC MORGAN SAR-TAIN, a citizen of the United States, residing at Tracy City, in the county of Grundy and State of Tennessee, have invented a new and useful Spring-Tire, of which the following is a specification.

The device forming the subject matter of this application is a tire, and one object of the invention is to provide a structure of this kind in which pneumatic elements subject to puncture and deterioration are dispensed with.

Another object of the invention is to provide novel means for preventing undesirable lateral and circumferential movements between the tread and the rim portion of the structure.

Another object of the invention is to provide novel means for housing the springs whereby the tread is yieldingly supported with respect to the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:—

Figure 1 is a side elevation showing a portion of a wheel embodying the present invention, parts being broken away and parts appearing in section;

Fig. 2 is a section taken approximately on the line 2—2 of Fig. 1;

Fig. 3 is a section taken approximately on the line 3—3 of Fig. 2;

Fig. 4 is a plan view showing a portion of the tread; and

Fig. 5 is a section taken approximately on the line 5—5 of Fig. 4.

In carrying out the present invention there is provided a rim 1 which preferably is made of metal, the same including a base 2, side flanges 3, and partitions 4 uniting the side flanges 3, the partitions being formed integrally with or otherwise connected to the base 2 of the rim. The partitions 4 are provided with opposed ribs 50 projecting circumferentially of the rim 1. The construction of the rim obviously is such that it is provided with a plurality of compartments 5. The base 2 of the rim carries bosses 6 upstanding within the compartments 5.

The tread portion of the tire is made of a plurality of pivotally connected plates 7. Each plate 7 has opposed inwardly projecting wings 8. The wings 8 are located between the side flanges 3 of the rim 1 and the ribs 50, and they are located, also, between adjacent partitions 4. From the foregoing it will be obvious that any tendency on the part of the tread to move transversely, or to creep circumferentially will be limited by the coaction between the wings 8, the flanges 3 and the ribs 50 in the one instance, and between the wings 8 and the partitions 4 in the other instance. The ribs 50 reinforce the partitions 4, and prevent one of the wings 8 from engaging the springs 16 (hereinafter described) in case side-skidding takes place, and in case the opposite wing 8 breaks off.

Each plate 7 is provided on its inner surface with a boss 15. Compression springs 16 extend between the base 2 of the rim 1 and the plates 7, the ends of the springs being mounted on the bosses 15 and 6. The wings 8 serve to protect the springs 16 at the sides of the structure. Each plate 7 is provided at one end with knuckles 9 between which is received a knuckle 10 on the end of an adjoining plate. The knuckles 9 have openings 11, and the knuckle 10 has an opening 12. Through the openings 11 and 12 of the several plates 7 are passed pivot elements 14. The openings 11 receive the end portions of the pivot elements 14 closely, but the openings 12 receive the pivot elements somewhat loosely. As a consequence, a slight play in a radial direction, between the ends of adjoining plates 7 is possible, the resiliency of the structure being enhanced by this construction. The plates 7 preferably are fashioned from metal.

Superposed upon the tread, consisting of the pivotally connected plates 7, is a tire 17 which may be made of rubber or a rubber composition. The tire 17 may be attached to the plates 7, if desired. The tire 17 comprises inwardly extended flanges 18 which are resilient. Rings 19 are applied to the outer faces of the flanges 18, and securing elements 20, passing through the rings 19, enter the side flanges 3 of the rim 1.

In practical operation, the springs 16 thrust the tread 7 outwardly, and when pressure is applied to the tire 17, the springs will be compressed. As pointed out hereinbefore, the wings 8 exercise an important function in that they coöperate with the parts 4, 3 and 50 of the rim 1 to prevent undue relative movement between the tread and the rim. The flanges 18 of the tire 17, being secured to the side flanges 3 of the rim 1 prevent dirt from finding its way into the interior of the structure.

Having thus described the invention, what is claimed is:—

In the device of the class described, a rim including a base, side flanges, and partitions connecting the side flanges and forming compartments in the rim, the base having bosses extending into the compartments; a flexible tread made up of pivotally connected plates provided with bosses alined with the bosses of the base, the plates having inwardly projecting side wings received in the compartments, the outer surfaces of the wings coacting with the side flanges of the rim to prevent undue lateral movement, between the rim and the tread, the ends of the wings coöperating with the partitions to prevent undue circumferential creeping between the tread and the rim, the partitions having oppositely disposed radial ribs located between the side wings and helical compression springs located in the compartments, between the wings, the ends of the springs being engaged respectively, with the bosses of the base and the bosses of the plates to hold the springs out of engagement with the ribs, the side wings and the partitions.

In testimony that I claim the foregoing as my own, I have hereto affixed my signature in the presence of two witnesses.

ISAAC MORGAN SARTAIN.

Witnesses:
J. K. P. PEARSON,
BILL BARNES.